Nov. 12, 1929.  H. R. LIETZKE  1,735,826
TRANSMISSION CASE CAP
Filed Sept. 4, 1928
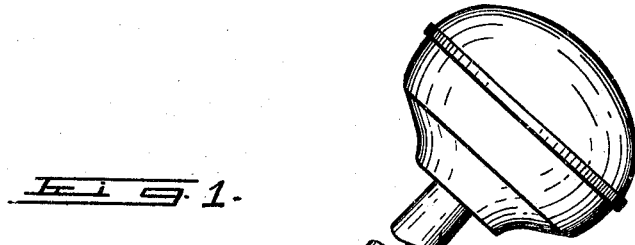
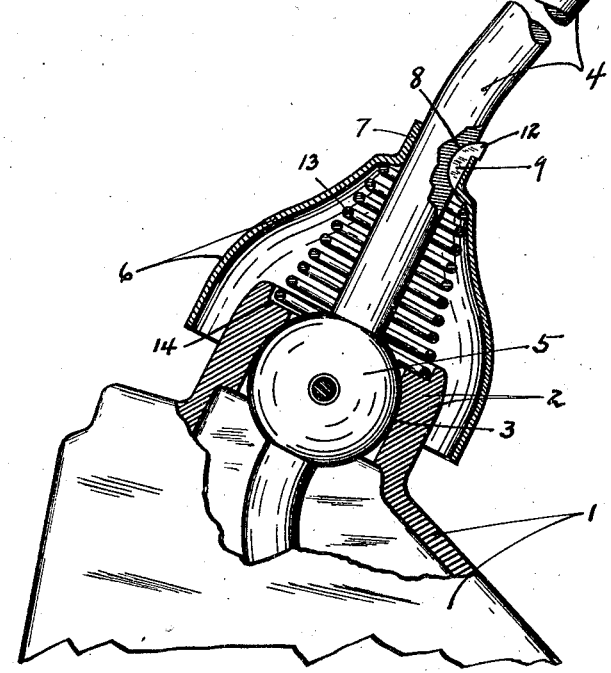
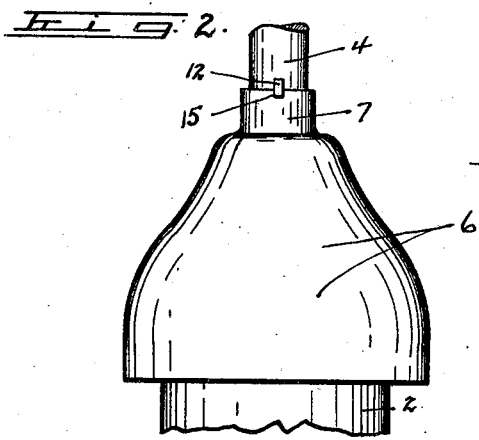
Henry R. Lietzke
INVENTOR
BY Denison Thompson
ATTORNEYS
WITNESS
J. T. Mains Patented Nov. 12, 1929

1,735,826

UNITED STATES PATENT OFFICE

HENRY R. LIETZKE, OF SYRACUSE, NEW YORK, ASSIGNOR TO THE WARNER CORPORATION, OF SYRACUSE, NEW YORK, A CORPORATION OF INDIANA

TRANSMISSION-CASE CAP

Application filed September 4, 1928. Serial No. 303,801.

This invention relates to a new and improved transmission case cap.

The transmissions for automotive vehicles are usually designed so that the shifting lever will be held in position in the top of the transmission case by means of a ball and socket connection so that the shifting lever may be rocked in different directions to shift into operative position the desired chain of gearing in the transmission.

The shifting lever enters the transmission case through the top of the latter and for the purpose of preventing the entrance into the transmission case of dirt and foreign matter through the shifting lever bearing a cap is usually provided. This cap is positioned on the shifting lever and extends downwardly over the upper part of the transmission case and in spaced relation thereto so that it will at all times act as a protective hood for the opening in the transmission case. Hitherto the practice has been to secure this cap in place by a screw extending through the cap into the lever. It has been found difficult and expensive to secure the cap in this manner because of the fact that the shifting lever being round and being made of steel it is difficult to drill and tap the lever. Furthermore with such a securing means there is always the possibility that the same may become loosened so that the parts will not be held in the proper relative position.

The main object of my invention is to provide a means whereby the cap for a transmission case may be held securely in position on a shifting lever but which means will at the same time permit the cap to be assembled with the shifting lever with facility.

Another object is to provide a fastening means of such a character that the same can be manufactured quickly and economically Another object is to provide a means which is so designed that there can be no possibility of the same becoming loosened.

Other objects and advantages relate to the size, shape and arrangement of parts all as will more fully appear from the following description taken in connection with the accompanying drawings, in which:

Figure 1 is a side elevation partially broken away and partially in section of my cap in position on a shifting lever.

Figure 2 is a side elevation partially broken away of my cap and a shifting lever.

Figure 3 is a perspective view of the locking key used in my device.

In the drawings I show the upper portion of a transmission case —1— having an upwardly extending collar —2— provided with an internal socket —3—. A shifting lever —4— having an integral ball —5— is positioned in the transmission case —1— with the ball —5— in registration with socket —3—. The cap —6— is conical in form with its lower end of a greater diameter than the diameter of collar —2—. Cap —6— carries on its upper end a vertically extending collar —7— having an internal diameter approximately the same as the external diameter of the shifting lever —4—. I provide in shifting lever —4— a curved slot —8— for the reception of a locking key —9—. Locking key —9— has a curved bottom face —10— and a top flat face —11— and is provided at one end of face —11— with an upwardly extending integral stop —12—. The size and shape of key —9— is such that when it is in position in slot —8— the face —11— will be flush with the outer surface of the shifting lever —4— and the stop —12—will extend outwardly therefrom a distance approximately the same or slightly greater than the thickness of collar —7—. I also provide a spiral spring —13— for a purpose hereinafter to be described.

When it is desired to assemble cap —6— on shifting lever —4— I first place in position spring —13— with its lower end abutting against the top surface of collar —2—, collar —2— being provided with a circular recess —14— for the reception of spring —13—. I then place cap —6— on lever —4— and move the same downwardly until it contacts with the upper end of spring —13—. Cap —6— is then forced downwardly against the action of spring —13— until slot —8— is exposed above collar —7—. Locking key —9— is then placed in position in slot —8— with stop —12— at the upper end thereof. Cap —6— is then allowed to move upwardly along the face —11— of locking key —9— until it contacts with stop —12—, collar —7— being provided with a slot —15— into which stop —12— enters. The tension of spring —13— is such that collar —7— of cap —6— will at all times be held securely against stop —12—. Slot —15— in collar —7— is provided to prevent any relative rotary movement between cap —6— and shifting lever —4—.

I have here shown a means for securing a cap in position on the shifting lever of a transmission but it will be understood that such a means for securing a cap on a lever or other shaft may be employed for different purposes and on different types of apparatus without departing from the spirit of my invention, for altho I have shown and described a specific structure and form of part as an exemplification of an embodiment of my invention I do not desire to restrict myself to the exact size, shape or relation of parts as various modifications may be made within the scope of the appended claims.

What I claim is:

1. In a device of the class described, a housing, a lever extending through the housing and provided with a slot, a cap removably mounted on the lever, a removable key positioned in the slot in the lever and formed with a stop, and spring means for holding the cap against the stop on the key.

2. In a device of the class described, a housing, a lever extending through the housing and provided with a slot, a cap removably mounted on the lever and having a collar, a removable key positioned in the slot and formed with a stop, and spring means for holding the collar on the cap against the stop on the key.

3. In a device of the class described, a housing, a lever extending through the housing and provided with a slot, a cap removably mounted on the lever, a collar on the cap provided with a notch, a removable key in the slot in the lever and formed with a stop, and spring means for holding the stop on the key in the notch in the collar.

4. In a device of the class described, a shaft provided with a slot, a cap removably mounted on the shaft, a removable key positioned in the slot in the shaft and formed with a stop, and spring means for holding the cap against the stop on the key.

5. In a device of the class described, a shaft having a recess therein, a cap mounted on the shaft and formed with a notch, a key having a portion lying within the recess in the shaft and under the cap so as to be held therein and a stop portion projecting outwardly from the shaft and positioned in the notch in the cap, and spring means for normally maintaining the parts in such relative position.

In witness whereof I have hereunto set my hand this 31st day of August, 1928.

HENRY R. LIETZKE.